Sept. 22, 1970   R. A. BUCHROEDER   3,529,888
CATADIOPTRIC OPTICAL SYSTEM FOR TELESCOPES AND THE LIKE
Filed Sept. 16, 1968   4 Sheets-Sheet 3

United States Patent Office 3,529,888
Patented Sept. 22, 1970

3,529,888
CATADIOPTRIC OPTICAL SYSTEM FOR TELESCOPES AND THE LIKE
Richard A. Buchroeder, 7270 E. 19th St., Tucson, Ariz. 85710
Filed Sept. 16, 1968, Ser. No. 759,996
Int. Cl. G02b 15/14, 17/02
U.S. Cl. 350—184                                    4 Claims

ABSTRACT OF THE DISCLOSURE

A catadioptric optical system useful as an astronomical telescope, a terrestrial telescope, and for other purposes. The incoming light is reflected by a primary mirror onto a secondary mirror, coaxial with the primary mirror and of considerably smaller diameter. The secondary mirror reflects the beam toward a central opening in the primary mirror, the reflected beam passing through a field lens which directs the beam into a relay lens system where much of the correction of aberrations takes place. In a simple form of the construction, all of the curved surfaces are spherical and only two kinds of glass are used and only two different radii of curvature are used on the lens surfaces, thus providing a construction which may be made relatively easily by an amateur telescope maker.

BACKGROUND OF THE INVENTION

Many forms of catadioptric optical systems are known in the art. A convenient summary of the principal known forms in an article entitled "Catadioptric Lenses" by John J. Villa, recently published in two parts in the magazine "Optical Spectra," part 1 of the article being in the issue of this magazine for March/April 1968, pages 57–63, and part 2 of the article being in the issue of this magazine for May/June 1968, pages 49–55. Certain forms of the present invention intended to be covered by the present patent application, have been published in an article by the present applicant, entitled "A New Catadioptric Telescope Design Suitable For ATM's" in the magazine "Sky and Telescope" for April 1968, volume 35, No. 4, pages 249–254. The above mentioned published articles by Villa and by the present applicant are incorporated herein by reference, and the present specification will proceed on the assumption that the reader is already familiar with these articles and that information and explanations given in these published artciles can be omitted from the present specification for the sake of brevity, on the understanding that the disclosures of the published articles are to be regarded as being completely incorporated herein.

Many of the prior forms of catadioptric optical systems have given reasonably good image results, at least for some purposes, but have been too difficult or too expensive to make, especially for the amateur telescope maker, and sometimes even difficult and expensive from the standpoint of professional manufacturers of equipment of this kind.

An object of the present invention is the provision of a catadioptric system which gives a sufficiently good image to be acceptable and useful for many purposes and yet which avoids inclusion of features which would make the system difficult and expensive for a professional manufacturer and perhaps even prohibitive or impossible for the average amateur manufacturer.

Another object is the provision of a catadioptric optical system utilizing a relay lens assembly for producing at least a substantial part of the desired correction of aberrations, in combination with a field lens for properly directing the light beam, as reflected from a secondary mirror, into the relay lens system.

Still another object is the provision of a catadioptric system of comparatively simple form, utilizing in combination a primary mirror which is a first surface reflector, a secondary mirror which in one embodiment is a first surface reflector and in another embodiment is a second surface reflector, a field lens receiving the beam of light from the secondary mirror, and a relay lens system into which the beam of light is directed by the field lens.

A further object is the provision of a catadioptric system having a minimum number of different kinds of glass and a minimum number of different radii of curvature while still producing an image sufficiently corrected to be acceptable and useful for the intended purpose.

A still further object is the provision of a catadioptric system of relatively simple and easily constructed character, in which all of the curved surfaces are spherical surfaces, the system nevertheless having sufficient correction of aberrations to produce an acceptable and useful image.

BRIEF DESCRIPTION OF THE DRAWINGS

The foregoing and other desirable objects and advantages may be attained in the manner disclosed as an illustrative embodiment of the invention in the following description and in the accompanying drawings which are incorporated herein by reference and which form a material part of the disclosure, in which.

DESCRIPTION OF THE PREFERRED EMBODIMENTS

Figure 1:
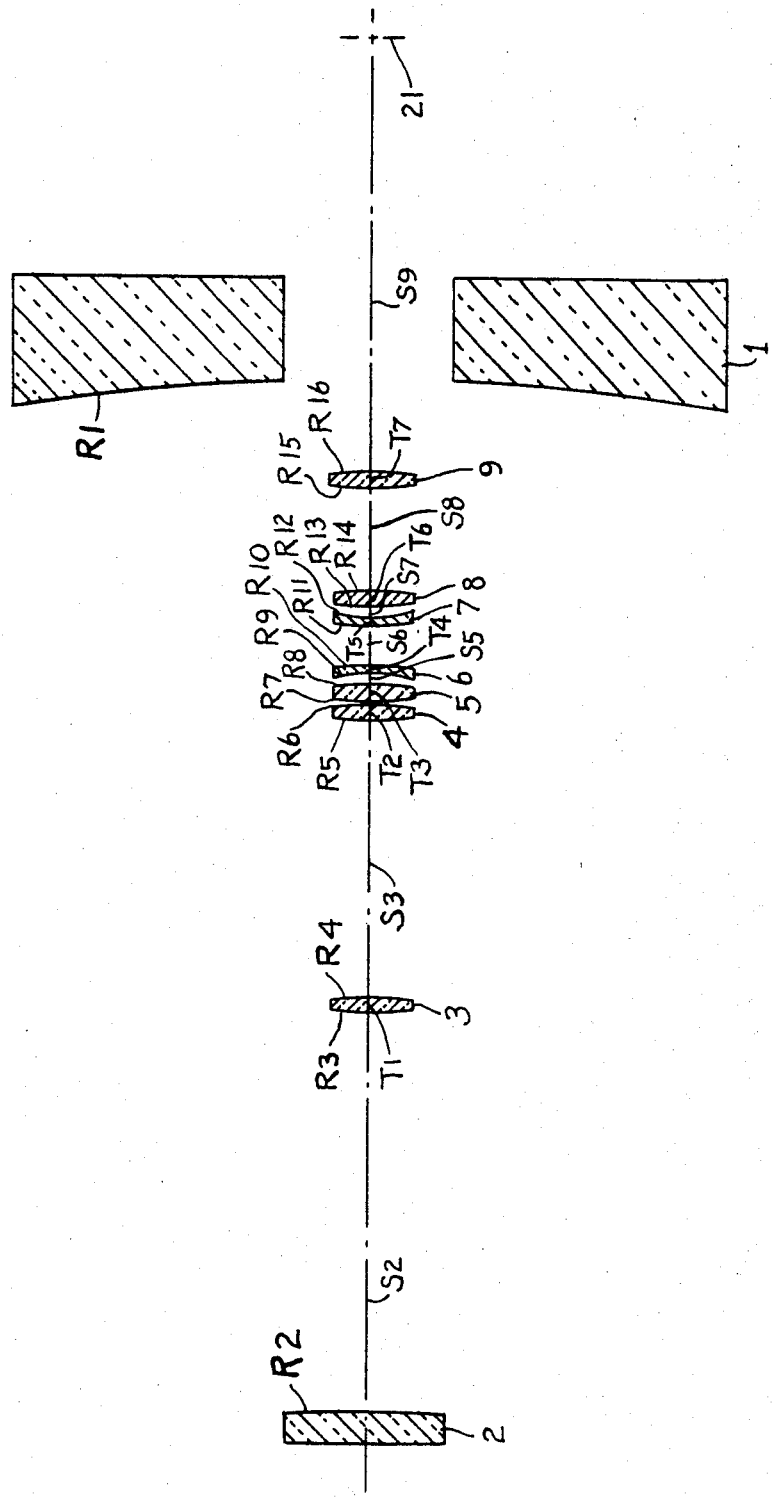
FIG. 1 is a schematic diagram of a catadioptric optical system in accordance with a first embodiment of the invention.

The general nature of the invention will be apparent from what has been said above. A first specific embodiment is shown schematically in FIG. 1, and comprises a primary mirror which is a first surface reflector having a concave spherical reflecting surface, and constitutes element 1 of the optical system. The light is assumed to come from the left, and impinges rightwardly upon element 1, which reflects the light beam onto the first surface convex spherical reflector constituting element 2. If element 2 were not in the path of the light reflected from element 1, the reflected beam from element 1 would be brought to a first focus on the optical axis and somewhat to the left of element 2. But element 2, being in the path of the beam reflected from element 1, reflects the beam to a second focus on the optical axis, between element 1 and element 2.

To the right of this second focus is a bi-convex lens 3 which constitutes a field lens interposed in the path of the diverging beam of light beyond the second focus, to concentrate this beam so that it passes into and through what may be called a relay lens system or transfer lens system composed of six elements identified as elements 4, 5, 6, 7, 8, and 9. The relay lens system brings the beam to a focus at the final focus 21.

It will be readily apparent from the diagram, FIG. 1, that all elements are alined on the optical axis, and that the light as reflected from element 2 and passing through elements 3–9 goes through a central aperture in element 1.

The numerical data for this first embodiment of the invention are as shown in Table 1 below.

TABLE 1

| Element | N and V | Radii mm. | Thicknesses and separations, mm. |
|---|---|---|---|
| 1 | | R1=−2,540.0 | S1=−1,016.0 |
| 2 | | R2=−860.0 | S2=684.0 |
| 3 | 517645 | R3=222.0 | T1=8.0 |
|  |  | R4=−222.0 | S3=226.0 |
| 4 | 517645 | R5=222.0 | T2=8.0 |
|  |  | R6=−222.0 | S4=1.0 |
| 5 | 517645 | R7=222.0 | T3=8.0 |
|  |  | R8=−222.0 | S5=6.0 |
| 6 | 617366 | R9=−70.0 | T4=4.0 |
|  |  | R10=−222.0 | S6=22.5 |
| 7 | 617366 | R11=222.0 | T5=4.0 |
|  |  | R12=70.0 | S7=7.5 |
| 8 | 517645 | R13=222.0 | T6=8.0 |
|  |  | R14=−222.0 | S8=58.0 |
| 9 | 517645 | R15=222.0 | T7=8.0 |
|  |  | R16=−222.0 | S9=241.0 |

In foregoing Table 1, as well as in the subsequent tables, the linear dimensions are expressed in millimeters, and all the notations are in accordance with the customary and conventional practice well understood in the art. Positive and negative values of R indicates surfaces respectively convex and concave toward the front. The surfaces are numbered consecutively in the order in which the light strikes them, so that R1 refers to the radius of curvature of the primary mirror, R2 refers to the radius of curvature of the secondary mirror, R3 and R4 refer to the respective front and rear surfaces of element 3, which is the field lens, and so on. No thicknesses are shown for elements 1 and 2, since these are first surface reflectors.

It may be mentioned that the composition of the glass, in the column headed "N and V, is given in the six-figure form now coming into wide use. The first three figures of the six-figure number repersent the index of refraction (N) expressed with reference to the spectral D line of sodium, minus one, while the last three figures represent the dispersive index or Abbe number (V) multiplied by ten. Thus the value 517645 representing the composition of element 3 in Table 1 means a glass in which N=1.517 and V=64.5.

In giving the thicknesses of the respective elements, the elements having thickness are numbered consecutively. Since elements 1 and 2 are first surface reflectors and have no thickness in an optical sense, the thickness of element 3 is expressed as T1, the thickness of element 4 is expressed as T2, and so on. Similarly, with respect to spaces, the respective spaces are consecutively numbered, and S1 represents the space from the primary mirror (element 1) to the secondary mirror (element 2), a minus sign being used with this space to indicate that in this space the light travels from right to left. Of course the light entering the system, from the object to element 1, travels from left to right, and the light after being reflected from element 2 also travels from left to right, through elements 3 to 9, inclusive S9 represents the distance from element 9 to the focal plane, and is the nominal back focal length.

In this first embodiment of the invention, the aperture of element 1 is 406.4 millimeters; the aperture of element 2 is 91.0 millimeters; element 3 is 45.0 mm.; element 4 is 35.2 mm.; element 5 is 34.0 mm.; element 6 is 31.0 mm.; element 7 is 29.0 mm.; element 8 is 32.0 mm.; and element 9 is 42.0 mm. The image in the focal plane has a diameter of 33.16 millimeters. The system has a focal length of 3312.0 mm., the nominal back focal length being 241.0 mm. as previously stated. The system covers a total field angle of 34 minutes of arc, this being the nominal field angle. Actually it can cover a field up to about one degree of total angle.

Because of its simplicity, this embodiment of the invention is particularly suitable for amateur telescope makers. It will be noted that only two kinds of glass are needed, and only two different radii of curvature are used for the lens surfaces. Elements 3, 4, 5, 8, and 9 are all of the same kind of glass, and all have the same radius of curvature on both front and rear surfaces. Elements 6 and 7 are both of the same kind of glass, and both of the same shape, one surface of each of these elements having the same radius as both surfaces of the other elements mentioned, while the other surface of each of elements 6 and 7 has a radius which is different from that of the other elements, but the same in element 6 as in element 7. These two elements are, of course, meniscus lenses, while all of the other lenses are bi-convex lenses. The optical system according to this first embodiment of the invention has a strongly curved field, which may make it unsuitable for some purposes, but it is not a serious detriment to the use of this system in a telescope where the image is to be observed visually, and the slight disadvantage of the curved field is more than counterbalanced by the simplicity of the optical system and the ease with which it can be made by an amateur telescope maker. All aberrations except field curvature are well corrected, in this form of the invention.

Figure 2:
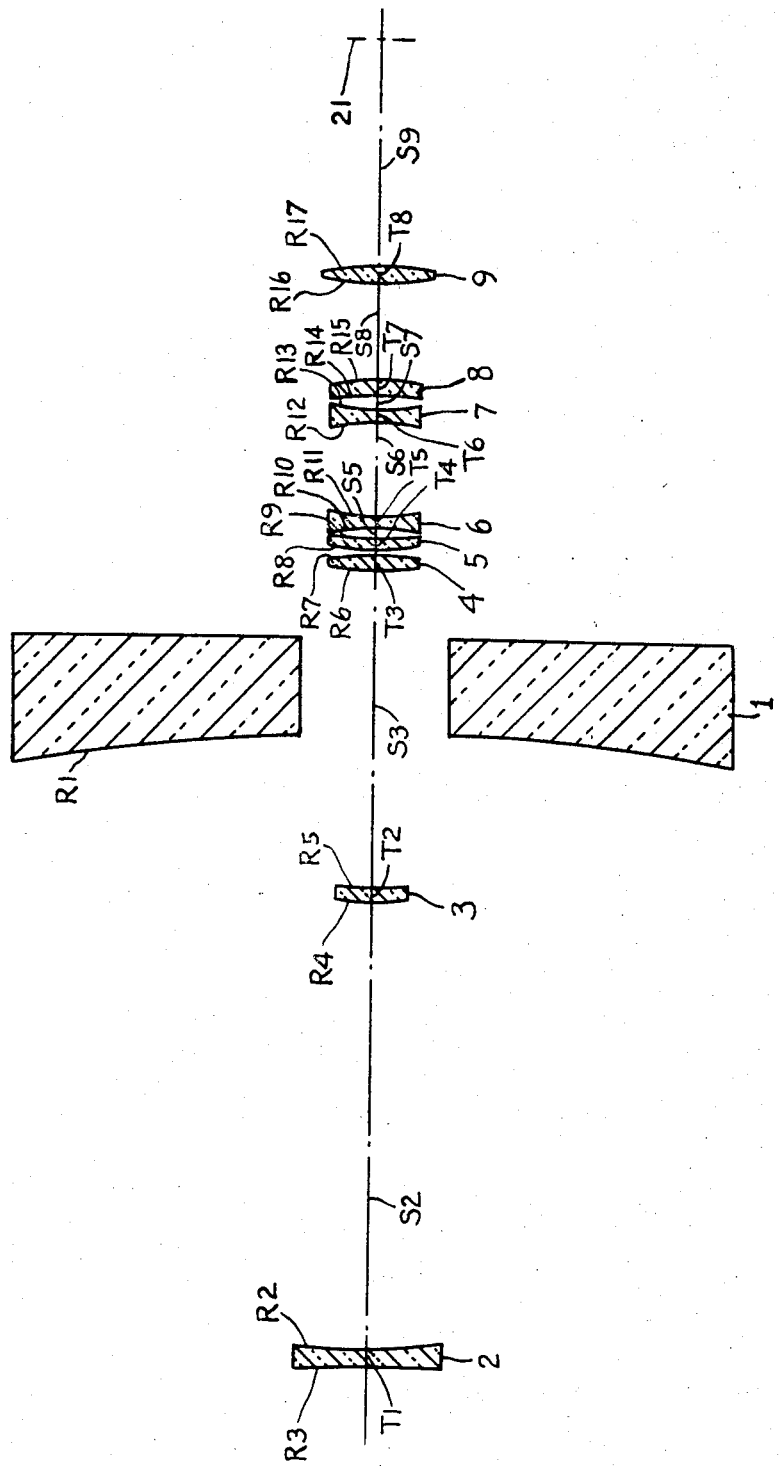
FIG. 2 is a similar view of a second embodiment.

A second embodiment of the invention is illustrated diagrammatically in FIG. 2. As in the first embodiment, the primary mirror, element 1, is a first surface reflector. However, in this embodiment the secondary mirror, element 2, is a second surface reflector, sometimes called a Mangin mirror so that the light passes through the thickness of this element 2 and is refracted thereby, then is reflected from the second surface of the element, and passes again through the thickness thereof and is again refracted. The light from element 2 then goes to the field lens, element 3, and is directed thereby to the relay lens systems or transfer lens system, which forms the final image in the focal plane. Table 2 gives the details of this second embodiment illustrated in FIG. 2.

TABLE 2

| Element | N and V | Radii | Thicknesses and separations | Aperture |
|---|---|---|---|---|
| 1 | | R1=−2,032.0 | S1=−832.8 | 508.0 |
| 2 | 517645 | R2=434.0 | T1=14.0 | 100.0 |
|  |  | R3=−1,688.0 | S2=585.0 |  |
| 3 | 517645 | R4=122.2 | T2=10.0 | 48.0 |
|  |  | R5=434.0 | S3=362.0 |  |
| 4 | 517645 | R6=203.2 | T3=12.0 | 62.0 |
|  |  | R7=−203.2 | S4=1.0 |  |
| 5 | 517645 | R8=122.2 | T4=10.0 | 60.0 |
|  |  | R9=434.0 | S5=7.0 |  |
| 6 | 517645 | R10=−167.6 | T5=5.0 | 56.0 |
|  |  | R11=167.6 | S6=72.8 |  |
| 7 | 516745 | R12=−167.6 | T6=5.0 | 50.0 |
|  |  | R13=167.6 | S7=7.0 |  |
| 8 | 517645 | R14=−434.0 | T7=10.0 | 54.0 |
|  |  | R15=−122.2 | S8=71.2 |  |
| 9 | 517645 | R16=203.2 | T8=12.0 | 76.0 |
|  |  | R17=−203.2 | S9=396.7 |  |

This second form or embodiment of the invention may be described briefly as a 20 inch $f/6$ lens or optical system, whereas the first embodiment may be described as a 16 inch $f/8.15$ system. The second embodiment has an equivalent focal length of 3048.0 mm., and a nominal back focal length of 396.7 mm. It has a nominal total field angle of 34 minutes of arc, and an image size of 30.4 mm. in diameter. It has a partially flat field.

It will be noted especially that the lens system according to this second embodiment of the invention uses only one kind of glass. Because of this, it is suitable for ultraviolet use, since the lenses can be made of quartz or other suitable material transmitting ultraviolet light, or other specialized materials can be used if infrared transmission is desired. In the specific form here disclosed, good correction of aberrations is achieved, and the field is considerably flatter than in the first embodiment. The spectrum may be reduced to zero, but is preferably made slightly overcorrected, violet focusing further out than red, to compensate for undercorrected violet and overcorrected red spherical aberration.

Figure 3:
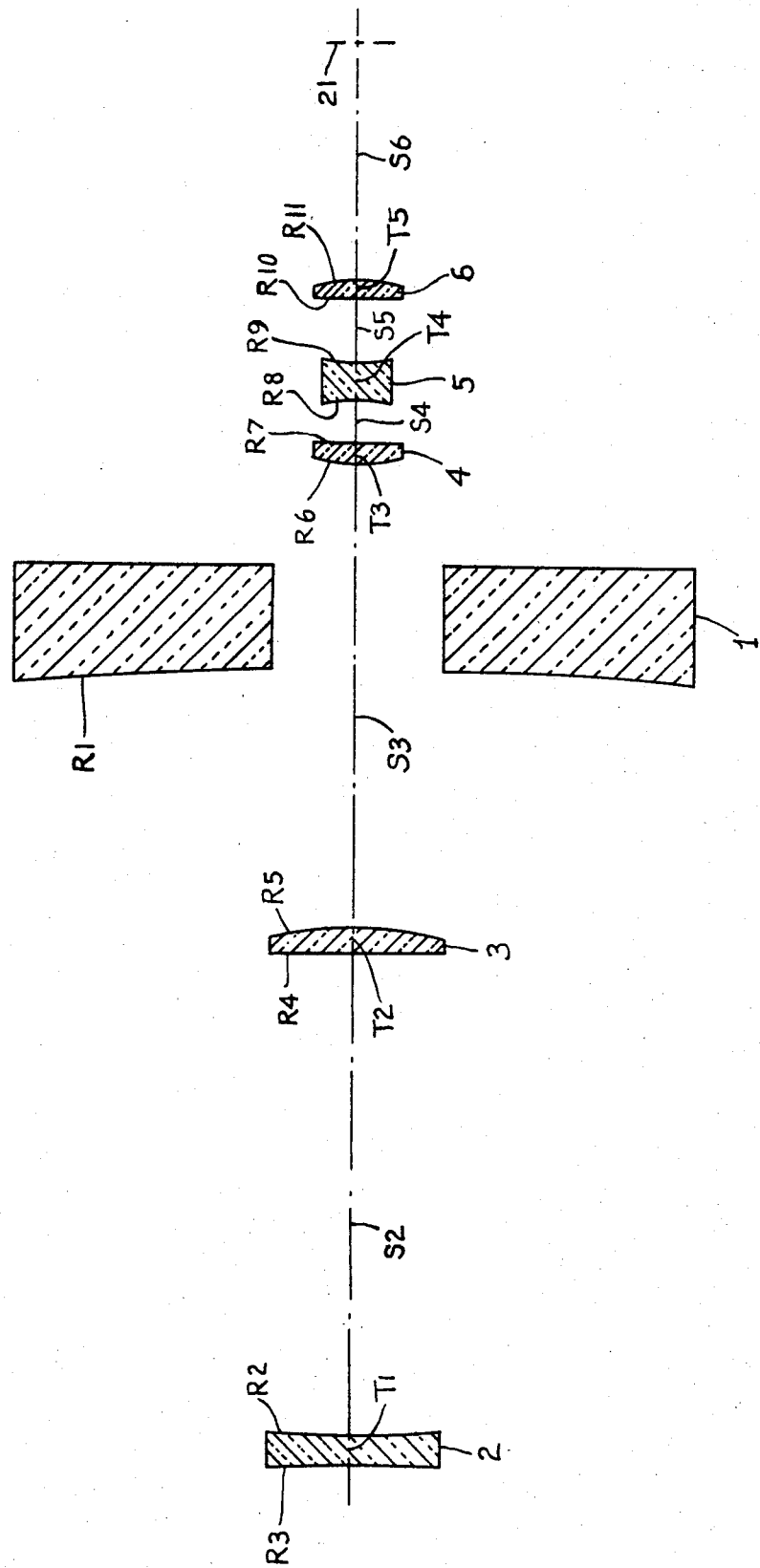
FIG. 3 is a similar view of a third embodiment.

A third embodiment of the invention is illustrated diagrammatically in FIG. 3. Like the second embodiment, the secondary mirror is a second surface reflector rather than a first surface reflector. Like the first embodiment, only two different kinds of glass are used. The preferred form in this third embodiment is that the glasses have widely differing refractive index, but closely matched dispersive index (Abbe number). Apochromatic combinations with unusually low tertiary spectra are thus easily obtained with common glass. The Rare Earth glasses (containing elements such as Lanthanum and Thorium) allow still further improvement in field coverage and speed, yet maintain an image free of false color. The numerical data for this third embodiment are given in Table 3 below.

rather than the six used in the first and second embodiments. It may be described as a 19⅜ inch lens, $f/8$. It has an equivalent focal length of 3937.0 mm., a nominal back focal length of 365.6 mm., an image size of 68.6 mm. diameter, and covers a total angular field of one degree. The field of the lens is relatively flat.

In this embodiment, the cost, transparency for the visible spectrum, and utmost simplicity, were primary design goals. A system in accordance with this third embodiment, or such variations thereof as will be obvious to a skilled lens designer in view of the present disclosure, is capable of relatively high speed, and has great compactness and covers a wide field. Such a system is highly desirable as a visual telescope, but may be of limited astronomical importance because of absorption in the ultraviolet range.

Figure 4:
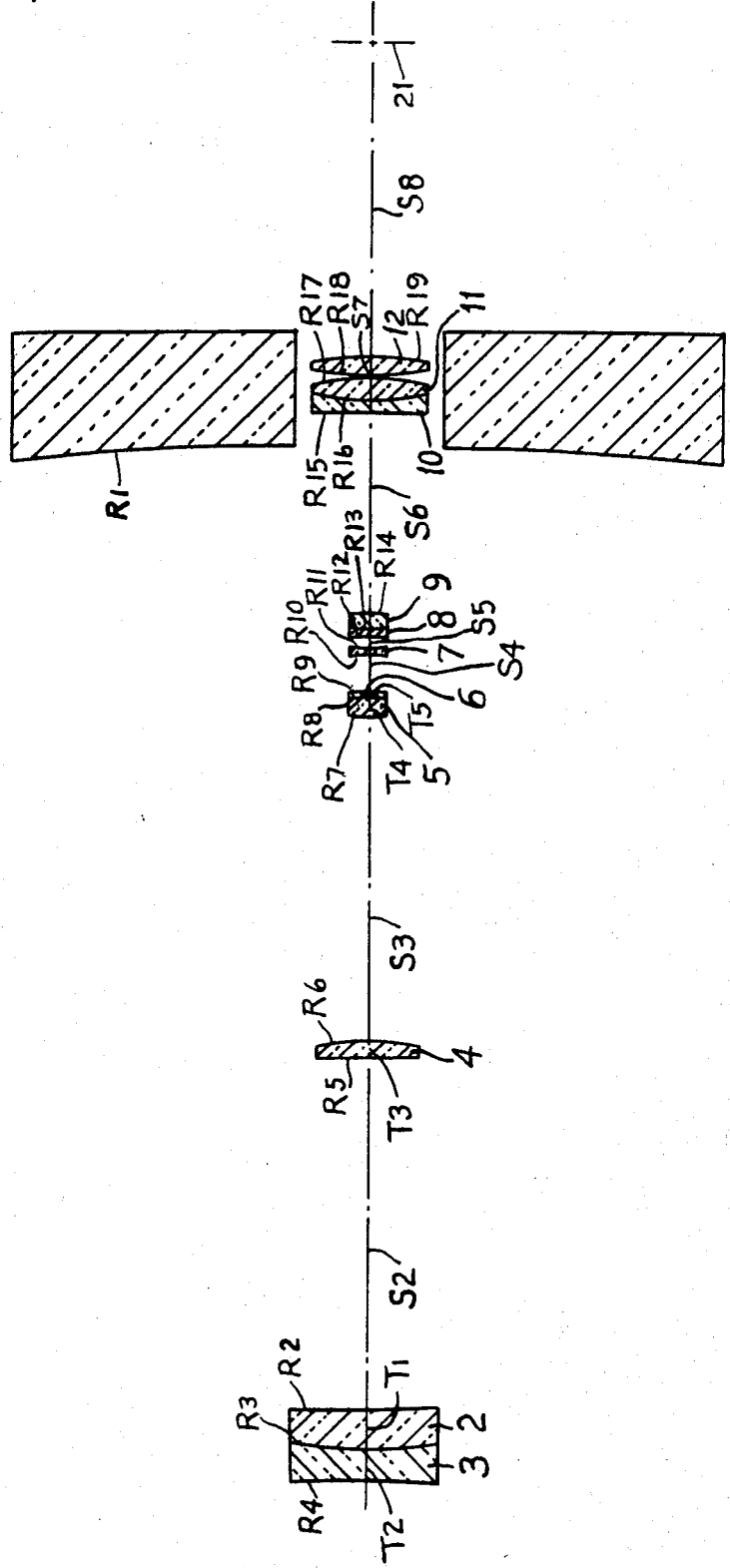
FIG. 4 is a similar view of a fourth embodiment of the invention.

A fourth embodiment of the invention, illustrated schematically in FIG. 4, shows that the principles of the invention may be used with a zoom arrangement. In this embodiment, the primary mirror is a first surface reflector. The secondary mirror is a second surface reflector, and is a double Mangin mirror. Elements 2 and 3 constitute a cemented doublet, the reflecting surface being on the second surface of element 3, so that after reflection thereby, the light passes a second time through element 3 and then a second time through element 2, going thence to the field lens which constitutes element 4. Elements 1 through 4 are stationary relative to each other. From the field lens, the light goes to the relay system, which is a zoom system with certain elements movable axially relative to other elements to produce the zoom effect. Numerical data are given in Table 4.

TABLE 3

| Element | N and V | Radii | Thicknesses and separations | Aperture |
|---|---|---|---|---|
| 1 | | R1=−3,937.0 | | 592.12 |
| | | R2=1,128.0 | S1=−1,575.0 | |
| 2 | 541473 | R3=−3,967.0 | T1=19.05 | 120.0 |
| | | R4=plano | S2=1,248.5 | |
| 3 | 670472 | R5=−293.8 | T2=19.05 | 120.0 |
| | | R6=111.58 | S3=618.2 | |
| 4 | 670472 | R7=plano | T3=12.7 | 56.0 |
| | | R8=−111.58 | S4=29.74 | |
| 5 | 541473 | R9=111.58 | T4=25.4 | 50.8 |
| | | R10=plano | S5=42.83 | |
| 6 | 670472 | R11=−111.58 | T5=12.7 | 66.0 |
| | | | S6=365.6 | |

TABLE 4

| Element | N and V | Radii | Thicknesses and separations | Aperture |
|---|---|---|---|---|
| 1 | | R1=−1,625.6 | | 203.2 |
| | | R2=321.4 | S1=−650.0 | |
| 2 | 617366 | R3=150.0 | T1=10.0 | 40.0 |
| 3 | 517645 | R4=−1,702.0 | T2=7.0 | 40.0 |
| | | R5=plano | S2=476.3 | |
| 4 | 517645 | R6=−52.7 | T3=5.0 | 27.0 |
| | | R7=39.7 | S3=variable | |
| 5 | 517645 | R8=−21.0 | T4=5.0 | 8.8 |
| 6 | 721292 | R9=−48.6 | T5=2.0 | 8.8 |
| | | R10=−39.7 | S4=variable | |
| 7 | 517645 | R11=23.8 | T6=2.0 | 7.8 |
| | | R12=−23.8 | S5=3.5 | |
| 8 | 517645 | R13=23.8 | T7=2.0 | 8.8 |
| 9 | 721292 | R14=−205.3 | T8=5.0 | 9.6 |
| | | R15=−357.7 | S6=variable | |
| 10 | 721292 | R16=69.8 | T9=3.0 | 27.6 |
| 11 | 517645 | R17=−69.8 | T10=6.0 | 28.6 |
| | | R18=100.9 | S7=1.0 | |
| 12 | 517645 | R19=−100.9 | T11=6.0 | 29.0 |
| | | | S8=284.5 | |

This third embodiment constructed in accordance with the data in Table 3 and shown schematically in FIG. 3, is somewhat simpler than the previous embodiments in that the relay lens system or transfer lens (between the field lens and the focal plane) uses only three elements, From the above numerical data, read in conjunction with FIG. 4, it will be seen that elements 2 and 3 constitute a cemented doublet, elements 5 and 6 are also a cemented doublet, elements 8 and 9 are likewise a cemented doublet, and elements 10 and 11 are a cemented doublet.

In Table 4 as well as the previous tables, the figures given for the size of the aperture are only approximations intended to indicate the relative diameters of the respective lenses.

The zoom motion is accomplished by conventional mechanism operating in accordance with the known optical principles well understood by those familiar with zoom lenses. The zoom motion is sufficiently defined by the following data:

Object to image separation, 134.43180 mm.
Positive group equivalent focal length, 56.01325 mm.
Negative group equivalent focal length, −22.40530 mm.
Magnification 0.25 to 1.25
Negative root of the quadratic equation.

With the relay group added and hiatal corrections made, representative separations are obtained as shown in Table 5.

TABLE 5

| | Telescope, f/# | S3 | S4 | S6 |
|---|---|---|---|---|
| Zoom Mag.: | | | | |
| 0.25 | 12 | 100.4716 | 10.3813 | 56.3815 |
| 0.50 | 24 | 77.4084 | 38.4686 | 51.3573 |
| 1.00 | 48 | 60.0983 | 63.5181 | 43.6180 |
| 1.25 | 60 | 87.1442 | 55.5958 | 24.4943 |

This fourth embodiment of the invention may be described as an eight inch lens, with the relative aperture varying (according to the zoom motion) from f/12 to f/60, and with the equivalent focal length likewise varying, according to the zoom motion, from 2438.4 mm. to 12192.0 mm. The angular field varies from 34 minutes to 6.8 minutes. The image size is 24.4 mm. in diameter, which is constant regardless of zoom.

The system is well corrected, as a whole, and gives excellent results.

It will be noted that in all the disclosed embodiments of the invention, there is a field lens between the secondary mirror and the relay lens or transfer lens system or assembly. The use of the field lens in this location is a characteristic feature of the present invention.

It will also be noted that in the disclosed specific embodiments, only spherical surfaces have been used. This is for the sake of simplicity and reduction of cost. Slightly better correction might be attained by using parabolic, hyperbolic, or other aspherical surfaces for the reflecting elements or for some of the lens faces, without departing from the principles of the invention, but sufficiently good results can be obtained for many purposes, without going to the extra expense of aspherical surfaces.

What is claimed is:

1. A catadioptric optical system comprising a primary mirror of concave spherical form for receiving light from an object and reflecting such light to form a converging beam, a secondary mirror in the path of said converging beam for reflecting said beam, a field lens in the path of said beam as reflected by said secondary mirror, and a relay lens system comprising a plurality of lens components in the path of said beam of light after it passes through said field lens, for forming an image of said object, wherein the elements of said system have characteristics substantially in the proportions indicated by data in the following table:

| Element | N and V | Radii, mm. | Thicknesses and separations, mm. |
|---|---|---|---|
| 1 | | R1=−2,540.0 | S1=−1,016.0 |
| 2 | | R2=−860.0 | S2=684.0 |
| 3 | 517645 | R3=222.0 | T1=8.0 |
| | | R4=−222.0 | S3=226.0 |
| 4 | 517645 | R5=222.0 | T2=8.0 |
| | | R6=−222.0 | S4=1.0 |
| 5 | 517645 | R7=222.0 | T3=8.0 |
| | | R8=−222.0 | S5=6.0 |
| 6 | 617366 | R9=−70.0 | T4=4.0 |
| | | R10=−222.0 | S6=22.5 |
| 7 | 617366 | R11=222.0 | T5=4.0 |
| | | R12=70.0 | S7=7.5 |
| 8 | 517645 | R13=222.0 | T6=8.0 |
| | | R14=−222.0 | S8=58.0 |
| 9 | 517645 | R15=222.0 | T7=8.0 |
| | | R16=−222.0 | | wherein element 1 is the primary mirror, element 2 is the secondary mirror, element 3 is the field lens, and elements 4 to 9 constitute the relay lens system, and wherein the compositions of the respective elements are indicated in the column headed N and V, and the radii of curvature of the respective surfaces and the thicknesses of elements and separation of successive elements from each other are indicated by the respective symbols R, T, and S, elements 1 and 2 both being first surface reflectors.

2. A catadioptric optical system comprising a primary mirror of concave spherical form for receiving light from an object and reflecting such light to form a converging beam, a secondary mirror in the path of said converging beam for reflecting said beam, a field lens in the path of said beam as reflected by said secondary mirror, and a relay lens system comprising a plurality of lens components in the path of said beam of light after it passes through said field lens, for forming an image of said object, wherein the elements of said system have characteristics substantially in the proportions indicated by data in the following table:

| Element | N and V | Radii, mm. | Thicknesses and separations, mm. |
|---|---|---|---|
| 1 | | R1=−2,032.0 | S1=−832.8 |
| | | R2=434.0 | |
| 2 | 517645 | R3=−1,688.0 | T1=14.0 |
| | | R4=122.2 | S2=585.0 |
| 3 | 517645 | R5=434.0 | T2=10.0 |
| | | R6=203.2 | S3=362.0 |
| 4 | 517645 | R7=−203.2 | T3=12.0 |
| | | R8=122.2 | S4=1.0 |
| 5 | 517645 | R9=434.0 | T4=10.0 |
| | | R10=−167.6 | S5=7.0 |
| 6 | 517645 | R11=167.6 | T5=5.0 |
| | | R12=−167.6 | S6=72.8 |
| 7 | 517645 | R13=167.6 | T6=5.0 |
| | | R14=−434.0 | S7=7.0 |
| 8 | 517645 | R15=−122.2 | T7=10.0 |
| | | R16=203.2 | S8=71.2 |
| 9 | 517645 | R17=−203.2 | T8=12.0 | wherein element 1 is the primary mirror and is a first surface reflector, element 2 is a lens having the secondary mirror formed as a reflecting surface on the second surface R3 of element 2, element 3 is the field lens, and elements 4 to 9 constitute the relay lens system, and wherein the compositions of the respective elements are indicated in the column headed N and V, and the radii of curvature of the respective surfaces and the thicknesses of elements and separation of successive elements from each other are indicated by the respective symbols R, T, and S.

3. A catadioptric optical system comprising a primary mirror of concave spherical form for receiving light from an object and reflecting such light to form a converging beam, a secondary mirror in the path of said converging beam for reflecting said beam, a field lens in the path of said beam as reflected by said secondary mirror, and a relay lens system comprising a plurality of lens components in the path of said beam of light after it passes through said field lens, for forming an image of said object, wherein the elements of said system have characteristics substantially in the proportions indicated by data in the following table:

| Element | N and V | Radii, mm. | Thicknesses and separations, mm. |
|---|---|---|---|
| 1 | | R1=−3,937.0 | S1=−1,575.0 |
| 2 | 541473 | R2=1,182.0 | T1=19.05 |
|   |        | R3=−3,967.0 | S2=1,248.5 |
| 3 | 670472 | R4=plano | T2=19.05 |
|   |        | R5=−293.8 | S3=618.2 |
| 4 | 670472 | R6=111.58 | T3=12.7 |
|   |        | R7=plano | S4=29.74 |
| 5 | 541473 | R8=−111.58 | T4=25.4 |
|   |        | R9=111.58 | S5=42.83 |
| 6 | 670472 | R10=plano | T5=12.7 |
|   |        | R11=−111.58 | | wherein element 1 is the primary mirror and is a first surface reflector, element 2 is a lens having the secondary mirror formed as a reflecting surface on the second surface R3 of element 2, element 3 is the field lens, and elements 4, 5, and 6 constitute the relay lens system, and wherein the compositions of the respective elements are indicated in the column headed N and V, and the radii of curvature of the respective surfaces and the thicknesses of elements and separation of successive elements from each other are indicated by the respective symbols R, T, and S.

4. A catadioptric optical system comprising a primary mirror of concave spherical form for receiving light from an object and reflecting such light to form a converging beam, a secondary mirror in the path of said converging beam for reflecting said beam, a field lens in the path of said beam as reflected by said secondary mirror, and a relay lens system comprising a plurality of lens components in the path of said beam of light after it passes through said field lens, for forming an image of said object, wherein the elements of said system have characteristics substantially in the proportions indicated by data in the following table:

| Element | N and V | Radii, mm. | Thicknesses and separations, mm. |
|---|---|---|---|
| 1 | | R1=−1,625.6 | S1=−650.0 |
| 2 | 617366 | R2=321.4 | T1=10.0 |
|   |        | R3=150.0 | |
| 3 | 517645 | R4=−1,702.0 | T2=7.0 |
|   |        | R5=plano | S2=476.3 |
| 4 | 517645 |           | T3=5.0 |
|   |        | R6=−52.7 | S3=variable |
|   |        | R7=39.7 | |
| 5 | 517645 | R8=−21.0 | T4=5.0 |
| 6 | 721292 |          | T5=2.0 |
|   |        | R9=−48.6 | S4=variable |
|   |        | R10=−39.7 | |
| 7 | 517645 | R11=23.8 | T6=2.0 |
|   |        |          | S5=3.5 |
|   |        | R12=−23.8 | |
| 8 | 517645 | R13=23.8 | T7=2.0 |
| 9 | 721292 |          | T8=5.0 |
|   |        | R14=−205.3 | |
|   |        | R15=−357.7 | S6=variable |
| 10 | 721292 |          | T9=3.0 |
|    |        | R16=69.8 | |
| 11 | 517645 |          | T10=6.0 |
|    |        | R17=−69.8 | S7=1.0 |
|    |        | R18=100.9 | |
| 12 | 517645 |          | T11=6.0 |
|    |        | R19=−100.9 | | wherein element 1 is the primary mirror and is a first surface reflector, elements 2 and 3 are lenses cemented together, the secondary mirror is formed as a reflecting surface on the second surface R4 of element 3, element 4 is the field lens, and elements 5 to 12 constitute the relay lens system, elements 5 and 6 being a cemented doublet, elements 8 and 9 also being a cemented doublet, and elements 10 and 11 also being a cemented doublet, and wherein the compositions of the respective elements are indicated in the column headed N and V, and the radii of curvature of the respective surfaces and the thicknesses of elements and separation of successive elements from each other are indicated by the respective symbols R, T, and S, and wherein the variable spaces S3, S4, and S6 are variable to produce a zoom effect of variable magnification approximately in the proportions indicated in the following table:

| | S3, mm. | S4, mm. | S6, mm. |
|---|---|---|---|
| Zoom magnification: | | | |
| 0.25 | 100.4716 | 10.3813 | 56.3815 |
| 0.50 | 77.4084 | 38.4686 | 51.3573 |
| 1.00 | 60.0983 | 63.5181 | 43.6180 |
| 1.25 | 87.1442 | 55.5959 | 24.4943 |

References Cited

UNITED STATES PATENTS 2,504,383   4/1950   Bouwers et al. _____ 350—199 X
2,685,820   8/1954   Kaprelian _____ 350—27

OTHER REFERENCES

Ingalls, A., "Telescoptics," Scientific American, December 1947, pp. 283–286.

DAVID SCHONBERG, Primary Examiner

P. A. SACHER, Assistant Examiner

U.S. Cl. X.R.

350—199